(12) United States Patent
Chiu

(10) Patent No.: US 7,522,754 B2
(45) Date of Patent: Apr. 21, 2009

(54) CONTINUOUS FINGERPRINT IMAGE RETRIEVAL DEVICE

(76) Inventor: Li-Kuo Chiu, 2F, No. 31, Lane 123, Tonghua St., Da-an District, Taipei City 106 (TW)

( * ) Notice: Subject to any disclaimer, the term of this patent is extended or adjusted under 35 U.S.C. 154(b) by 685 days.

(21) Appl. No.: 11/316,872

(22) Filed: Dec. 27, 2005

(65) Prior Publication Data

US 2007/0147666 A1 Jun. 28, 2007

(51) Int. Cl.
*G06K 9/00* (2006.01)
(52) U.S. Cl. ...................................... 382/124
(58) Field of Classification Search ................. 382/115, 382/124–127, 305, 312, 313; 340/5.52, 5.53, 340/5.82, 5.83; 356/71; 713/186; 902/1–3
See application file for complete search history.

(56) References Cited

U.S. PATENT DOCUMENTS

| 5,748,766 A * | 5/1998 | Maase et al. ................. 382/124 |
| 5,942,761 A * | 8/1999 | Tuli ........................... 250/556 |
| 6,501,847 B2 * | 12/2002 | Helot et al. .................. 382/126 |
| 2004/0215615 A1 * | 10/2004 | Larsson et al. .................. 707/9 |

* cited by examiner

*Primary Examiner*—Daniel G Mariam
(74) *Attorney, Agent, or Firm*—Young & Thompson

(57) ABSTRACT

A continuous fingerprint image retrieval device includes an electronic product, a finger ball runway provided externally to the electronic product, and a continuous fingerprint sensor disposed in the finger ball runway; an initial protrusion being provided on the surface of the runway at one end of the sensor; multiple scraper ribs being protruded between the initial protrusion and the travel of the sensor; a rising arc runway being disposed at the other end of the continuous fingerprint sensor to scrape water containment and/or fat off the finger ball and to retrieve correct and complete data of fingerprint image.

5 Claims, 5 Drawing Sheets

CONTINUOUS FINGERPRINT IMAGE RETRIEVAL DEVICE

FIELD OF THE INVENTION

The present invention is related to a continuous fingerprint image retrieval device, and more particularly, to one that is applied in personalized electronic products.

BACKGROUND OF THE INVENTION

Conventionally, the coding method is the most popular approach to protect the secret of personal data. However, the coding method is found with some disadvantages, such as that the user fails to always remember the code, and that the user is at the risk of having his code to be broken by others. Therefore, bio-recognition methods by using personal bio-data, e.g., fingerprint, vocal password, handwriting, and iris have been gradually developed into sound and effective ways of data protection. The bio-recognition method has the advantage that since the biological feature is an integral part of a human body, one does not have to particularly memorize for the recognition, and such biological feature is naturally burglarproof. Furthermore, the protection method incorporating with fingerprint bio-feature is not only considered as security-tight, but also allows convenient application.

Personalized electronic products adapted with fingerprint recognition device generally available in the market usually have a sensor disposed at a pre-selected location to retrieve the fingerprint. However, for compromising production cost and the size of the device, the area with lateral ribs is comparatively smaller; therefore, the fingerprint data can only be retrieved by having the fingerprint to correctly press and cover up the sensor in sequence. If the location to press the fingerprint flushed against the sensor is not exact, it is impossible to retrieve correct and complete fingerprint data thus to fail the recognition. The retrieval of a correct and complete fingerprint by the smaller area sensor is further compromised by the sweat on the finger ball where can easily catch dust in the air or on any object to blur the fingerprint

SUMMARY OF THE INVENTION

The primary purpose of the present invention is to provide a continuous fingerprint image retrieval device that incorporates a continuous fingerprint sensor and an electronic product with the latter disposed with a means to guide the fingertip to slide and designed with a structure to pare off dirt or fat found on the finger ball for retrieving correct and complete fingerprint image data.

To achieve the purpose, a finger ball runway is externally provided to a personalized electronic product. A continuous fingerprint sensor is disposed in the finger ball runway. An initial protrusion functioning as the start point where the fingertip first contacts the device is disposed on the surface of the finger ball runway at the end where the continuous fingerprint sensor is located. The distance between the initial protrusion and the continuous fingerprint sensor, e.g. that between the finger ball and the fingertip, defines the effective distance for the retrieval of fingerprint image. Multiple scraper ribs are disposed protruding from the finger ball runway between the initial protrusion and the continuous fingerprint sensor to scrape fat or dirt off the fingerprint before allowing a clean fingerprint to be retrieved by the sensor. When the user feels that his finger ball is lying flushed against those scraper ribs, it indicates that the finger ball has been laid flushed to ensure that the fingerprint is firmly pressed on the casing of the device and smoothly slide over the sensor. A rising runway is provided on the finger ball runway at the other end of the continuous fingerprint sensor to naturally open up the fingerprint on the finger ball to be ready for continuous retrieval by the sensor. The present invention by allowing the user to correctly press his fingertip on the initial protrusion, slide upon the runway, get oil and/or dirt scraped off by those scraper ribs, and have the image of his fingerprint continuously retrieved by the sensor provides a correct and complete retrieval of the fingerprint image data.

DETAILED DESCRIPTION OF THE PREFERRED EMBODIMENTS

Figure 1:
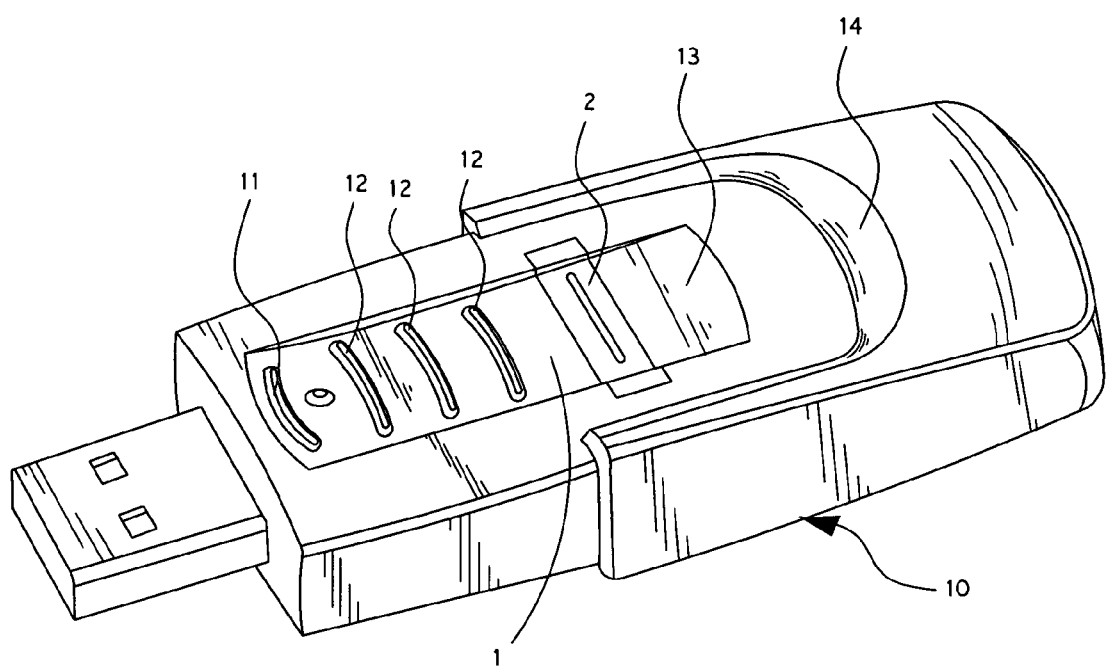
FIG. 1 is a perspective view of a continuous fingerprint retrieval device of the present invention.
Figure 2:
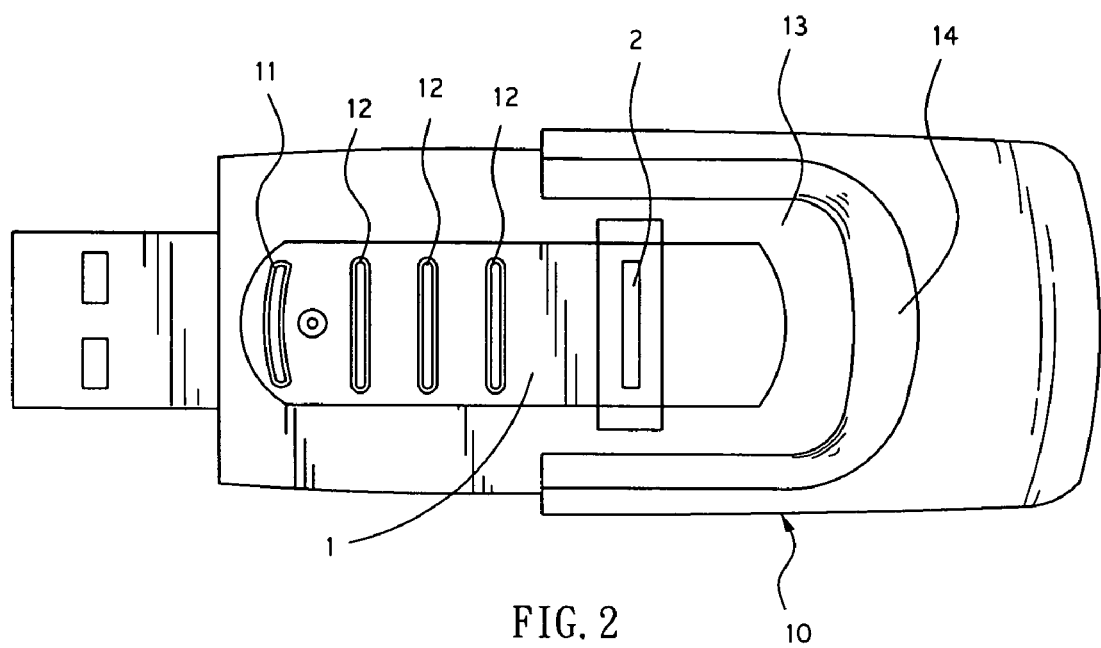
FIG. 2 is a front view of the continuous fingerprint retrieval device of the present invention.

As illustrated in the accompanying drawings, a preferred embodiment of a continuous fingerprint image retrieval device of the present invention is related to one that is applied in a personalized electronic product functioning as a mechanism to activate or encrypt the electronic product. The preferred embodiment of the present invention includes a finger ball runway 1 externally provided to a personalized electronic product 10, and a continuous fingerprint sensor 2 related to a conventional IC fingerprint sensor that provides continuous scan. Wherein, as illustrated in FIGS. 1 and 2, the finger ball runway 1 made in a recessed from is integrated with the casing of the electronic product 10, and the continuous fingerprint sensor 2 is disposed on the middle section of the finger ball runway 1. An initial protrusion 11 is provided on the surface of the finger ball runway at the distal end of the continuous fingerprint sensor 2 to function as the initial contact point for the fingertip. Multiple scraper ribs 12 are disposed on the surface of the finger ball runway between the initial protrusion 11 and the continuous fingerprint sensor 2 to scrape dirt or fat from the fingerprint to be retrieved by the sensor 2. A rising runway 13 is disposed on the finger ball runway 1 at the approximate end of the continuous fingerprint sensor 2 to naturally open up the fingerprint on the surface of the finger ball and to urge the user to lay his fingerprint flat to be retrieved by the continuous fingerprint sensor 2. A run 14 protrudes and surrounds the peripheral of the rising runway 13 to function as the prompt point of the end of the natural slide of the finger ball. In practice, the user puts his finger pint to correctly press on the initial protrusion 11, starts to slide in the runway 13, has dirt and/or fat on the finger ball to be scraped off by those scraper ribs 12, and stops at the rising runway 14 to allow the continuous fingerprint sensor 2 to retrieve complete and integral data of the fingerprint image.

The initial protrusion 11 and those scraper ribs 12 may be integrated with the casing of the electronic 10; or alternatively, incorporated with the surface of the finger ball runway 1 of the electronic product 10. Those scraper ribs 12 maybe comprised of resilient rubber material incorporated with the surface of the finger ball runway 1 to improve the cleaning purpose of scraping off dirt and/or fat on the finger ball. The run 14 may be integrated with the perimeter of the rising runway 13 at the rear end of the continuous fingerprint sensor 2 and made in a U shape to rise and surround the rear end and both sides of the rising runway 13 to function as a prompt point to stop the natural slide of the finger ball.

Figure 3:
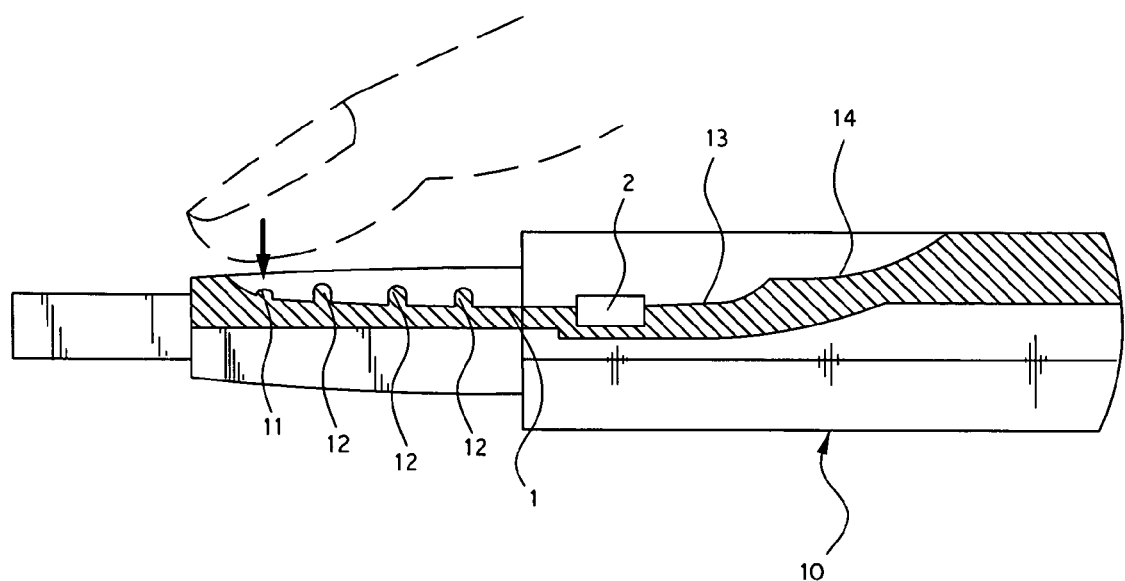
FIG. 3 is a schematic view showing that the present invention is in operation.
Figure 4:
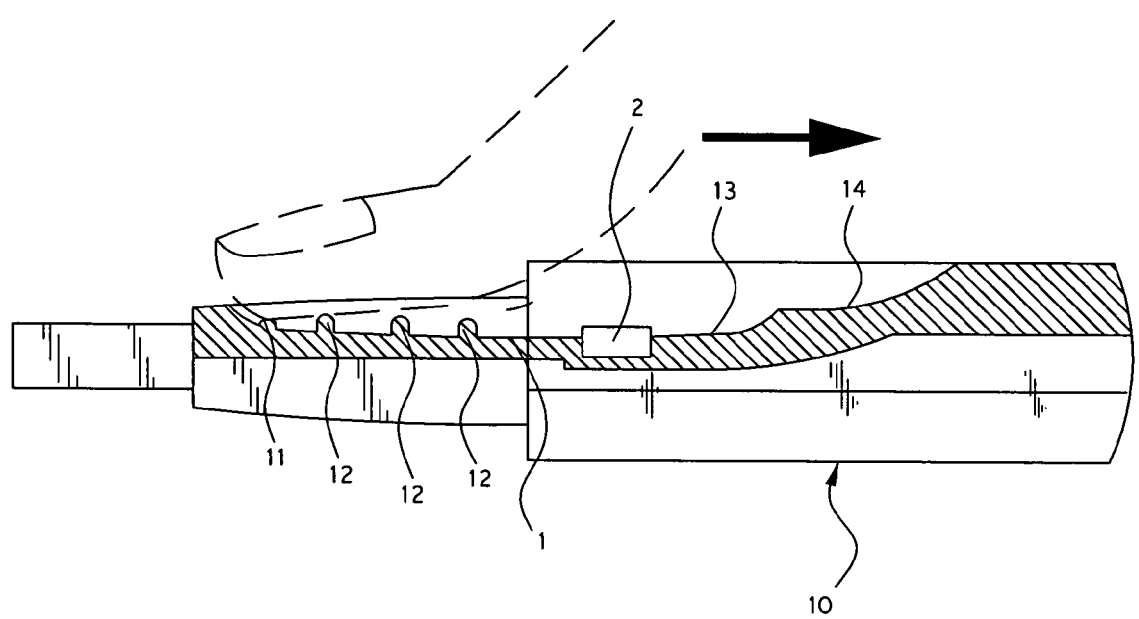
FIG. 4 is another schematic view showing that the present invention is in operation.
Figure 5:
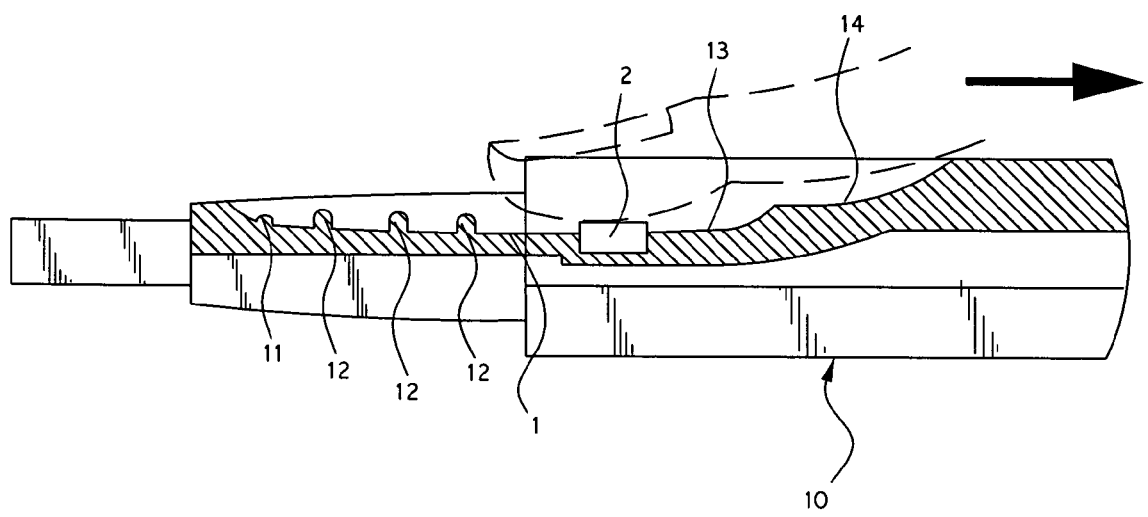
FIG. 5 is another schematic view yet showing that the present invention is in operation.

Referring to FIGS. 3, the user when desires to activate the electronic product 10 or to input fingerprint data to access to the encrypted data stored in the electronic product 10 press a fingertip on the initial protrusion of the finger ball runway 1 to be naturally guided to slide therein. The finger ball first passes through those scraper ribs 12 as illustrated in FIG. 4 to be scraped off any dirt, fat, or scale to allow a clean fingerprint to pass the continuous fingerprint sensor 2; once the fingertip slides to reach the rising runway 13, the fingerprint on the finger ball naturally opens up to be ready for the continuous fingerprint sensor 2 to retrieve as illustrate din FIG. 5; and once the finger ball slides to reach the run 14, it is prompted to stop, indicating that the fingerprint has been completely retrieved by the continuous fingerprint sensor 2. The present invention accordingly achieves the correct and complete retrieval of the fingerprint image data while allowing comfortable use by the user to further activate the electronic product 10 or access to the encrypted data stored in the electronic product 10.

Furthermore, the electronic product 10 is not restricted to an electronic product with specified function. As illustrated in FIGS. 1 and 2, the electronic product 10 may be related to a flash disk. MP3 player, digital audio recorder, PDA, Notebook, cellular phone or any computer peripherals, or an activation switch for fingerprint certification of any electronic product, e.g., a mouse, keyboard, and externally connected hard disk for data storage and connected to a computer, and to be adapted to the continuous fingerprint image retrieval device of the present invention or any other device as desire, thus to provide the electronic product 10 equipped with encryption or restricted access function.

The present invention provides an improved fingerprint image retrieval structure to retrieve a complete and correct fingerprint image data; therefore, a utility application is duly filed accordingly.

What is claimed is:

1. A continuous fingerprint image retrieval device includes an electronic product, a finger ball runway provided in recess externally to the electronic product, and a continuous fingerprint sensor disposed in the finger ball runway; an initial protrusion being provided on the surface of the runway at one end of the continuous fingerprint sensor; multiple scraper ribs being protruded between the initial protrusion and the travel of the continuous fingerprint sensor; a rising arc runway being disposed at the other end of the continuous fingerprint sensor.

2. The continuous fingerprint image retrieval device of claim 1, wherein the end of the rising runway is adapted with a run, and the run is related to a ⌐ shaped structure rising from and surrounding the rear end of the runway.

3. The continuous fingerprint image retrieval device of claim 1, wherein the initial protrusion and the scraper ribs are integrated with the casing of the electronic product or incorporated with the surface of the finger ball runway of the electronic product.

4. The continuous fingerprint image retrieval device of claim 1, wherein the scraper ribs is comprised of having a resilient rubber incorporated with the surface of the finger ball runway.

5. The continuous fingerprint image retrieval device of claim 1, wherein the electronic product relates to a flash disk, MP3 player, digital audio recorder, PDA, Notebook, cellular phone or any computer peripherals.

* * * * *